United States Patent
Elias

(10) Patent No.: US 6,460,298 B1
(45) Date of Patent: Oct. 8, 2002

(54) LANDSCAPE EDGING AND BORDER STRUCTURE

(76) Inventor: Steven A. Elias, 27 Sweetgrass Rd., Westhampton, NY (US) 11977

( * ) Notice: Subject to any disclaimer, the term of this patent is extended or adjusted under 35 U.S.C. 154(b) by 22 days.

(21) Appl. No.: 09/658,751

(22) Filed: Sep. 8, 2000

(51) Int. Cl.[7] .................................................. E02D 5/80
(52) U.S. Cl. .............................. 52/102; 52/601; 52/295; 52/464; 52/605; 47/33
(58) Field of Search .......................... 52/102, 295, 464, 52/601, 604, 605; 47/33; 404/7, 34, 37, 40

(56) References Cited

U.S. PATENT DOCUMENTS

| | | | |
|---|---|---|---|
| 2,235,356 A | * 3/1941 | Byers | ........................... 52/601 |
| 3,762,113 A | 10/1973 | O'Mullan et al. | |
| 4,365,743 A | * 12/1982 | Trickel et al. | .................. 238/8 |
| 4,761,095 A | 8/1988 | Bartlechner | |
| 4,869,018 A | * 9/1989 | Scales et al. | ................... 47/33 |
| 4,907,909 A | 3/1990 | Ruckstuhl | |
| 5,092,076 A | * 3/1992 | Terreta | ........................... 47/33 |
| 5,168,678 A | * 12/1992 | Scott, Jr. et al. | ............... 52/102 |
| 5,181,657 A | * 1/1993 | Davis | ............................. 238/8 |
| 5,317,933 A | 6/1994 | Goldman | |
| 5,442,877 A | * 8/1995 | Iindhal | .......................... 47/33 |
| 5,457,926 A | 10/1995 | Jensen | |
| D366,704 S | 1/1996 | Bryant | |
| 6,226,934 B1 | * 5/2001 | Gaston | ........................ 52/102 |

FOREIGN PATENT DOCUMENTS

| | | | | |
|---|---|---|---|---|
| FR | 489348 | * | 6/1919 | .................. 52/604 |
| GB | 144377 | * | 6/1920 | .................. 52/604 |
| SE | 257056 | * | 9/1948 | .................. 52/605 |

* cited by examiner

*Primary Examiner*—Lanna Mai
*Assistant Examiner*—Phi Dieu Tran A

(57) ABSTRACT

A landscape edging and border structure for providing inexpensive and easy-to-install decorative landscape edging. The landscape edging and border structure includes a plurality of blocks each having side walls, end walls and a bottom wall; and also includes a plurality of block anchor members each of which is securely attached to the bottom wall of a respective block with the block anchor members being adapted to penetrate a ground; and further includes a plurality of coupling members each being securely and removably fastened to two adjacently disposed blocks.

13 Claims, 2 Drawing Sheets

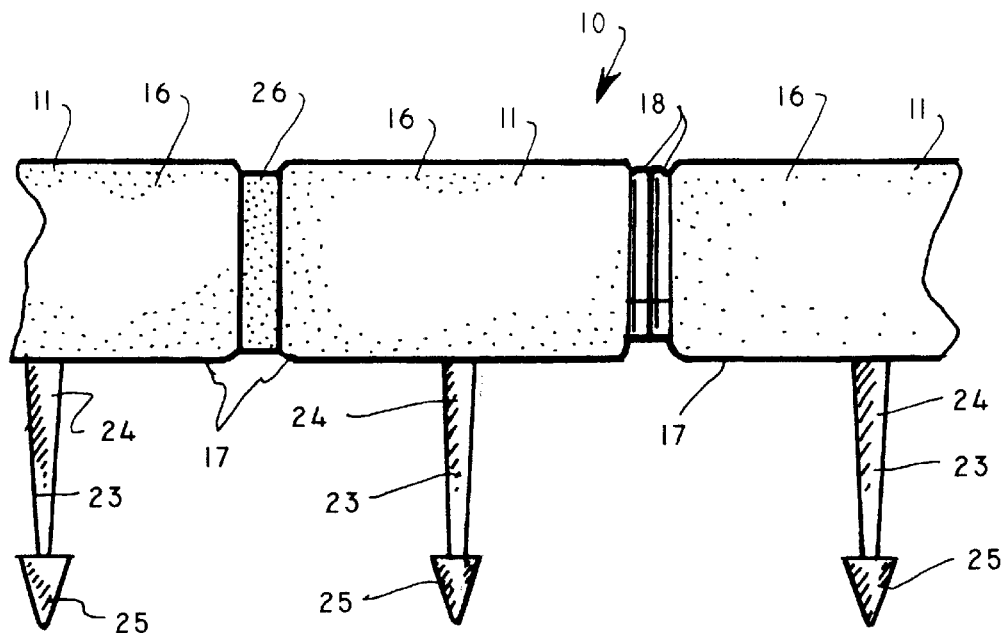
FIG.4
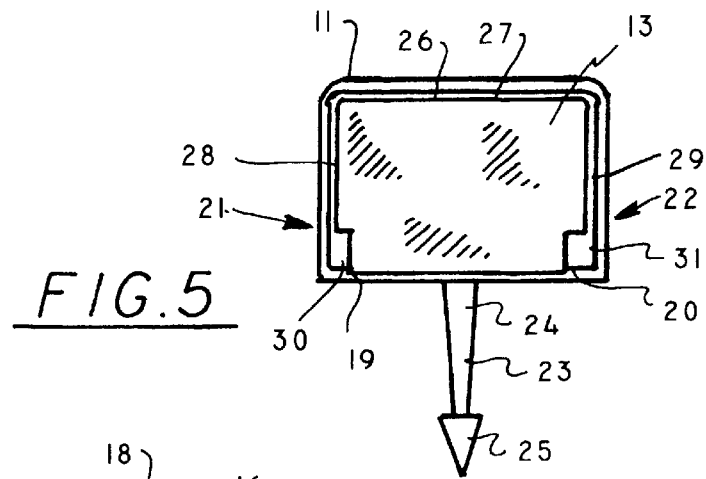
FIG.5
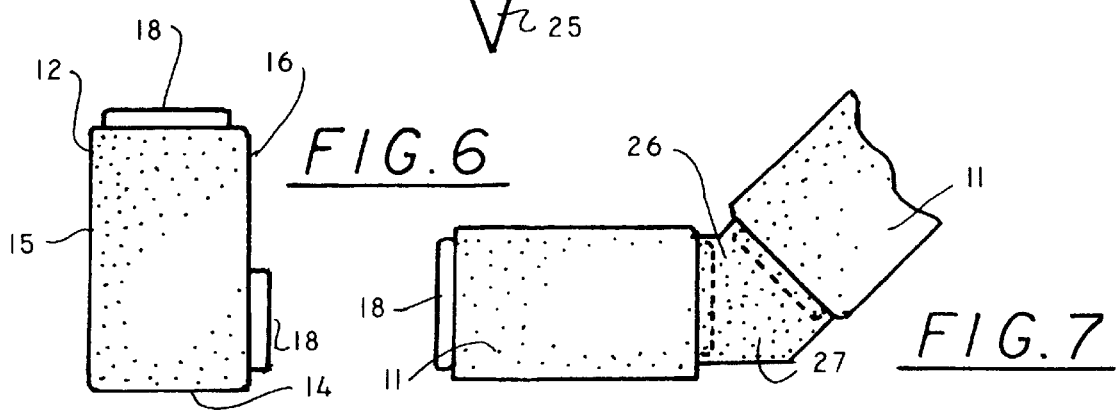
FIG.6
FIG.7

LANDSCAPE EDGING AND BORDER STRUCTURE

BACKGROUND OF THE INVENTION

1. Field of the Invention

The present invention relates to landscape blocks and more particularly pertains to a new landscape edging and border structure for providing inexpensive and easy-to-install decorative landscape edging.

2. Description of the Prior Art

The use of landscape blocks is known in the prior art. More specifically, landscape blocks heretofore devised and utilized are known to consist basically of familiar, expected and obvious structural configurations, notwithstanding the myriad of designs encompassed by the crowded prior. art which have been developed for the fulfillment of countless objectives and requirements.

Known prior art includes U.S. Pat. No. 5,317,933; U.S. Pat. No. 3,762,113; U.S. Pat. No. 4,761,095; U.S. Pat. No. 4,907,909; U.S. Pat. No. 5,457,926; and U.S. Pat. No. Des. 366,704.

While these devices fulfill their respective, particular objectives and requirements, the aforementioned patents do not disclose a new landscape edging and border structure. The inventive device includes a plurality of blocks each having side walls, end walls and a bottom wall; and also includes a plurality of block anchor. members each of which is securely attached to the bottom wall of a respective block with the block anchor members being adapted to penetrate a ground; and further includes a plurality of coupling members each being securely and removably fastened to two adjacently disposed blocks.

In these respects, the landscape edging and border structure according to the present invention substantially departs from the conventional concepts and designs of the prior art, and in so doing provides an apparatus primarily developed for the purpose of providing inexpensive and easy-to-install decorative landscape edging.

SUMMARY OF THE INVENTION

In view of the foregoing disadvantages inherent in the known types of landscape blocks now present in the prior art, the present invention provides a new landscape edging and border structure construction wherein the same can be utilized for providing inexpensive and easy-to-install decorative landscape edging.

The general purpose of the present invention, which will be described subsequently in greater detail, is to provide a new landscape edging and border structure which has many of the advantages of the landscape blocks mentioned heretofore and many novel features that result in a new landscape edging and border structure which is not anticipated, rendered obvious, suggested, or even implied by any of the prior art landscape blocks, either alone or in any combination thereof.

To attain this, the present invention generally comprises a plurality of blocks each having side walls, end walls and a bottom wall; and also includes a plurality of block anchor members each of which is securely attached to the bottom wall of a respective block with the block anchor members being adapted to penetrate a ground; and further includes a plurality of coupling members each being securely and removably fastened to two adjacently disposed blocks.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new landscape edging and border structure which has many of the advantages of the landscape blocks mentioned heretofore and many novel features that result in a new landscape edging and border structure which is not anticipated, rendered obvious, suggested, or even implied by any of the prior art landscape blocks, either alone or in any combination thereof.

It is another object of the present invention to provide a new landscape edging and border structure which may be easily and efficiently manufactured and marketed.

It is a further object of the present invention to provide a new landscape edging and border structure which is of a durable and reliable construction.

An even further object of the present invention is to provide a new landscape edging and border structure which is susceptible of a low cost of manufacture with regard to both materials and labor, and which accordingly is then susceptible of low prices of sale to the consuming public, thereby making such landscape edging and border structure economically available to the buying public.

Still yet another object of the present invention is to provide a new landscape edging and border structure which provides in the apparatuses and methods of the prior art some of the advantages thereof, while simultaneously overcoming some of the disadvantages normally associated therewith.

Still another object of the present invention is to provide a new landscape edging and border structure for providing inexpensive and easy-to-install decorative landscape edging.

Yet another object of the present invention is to provide a new landscape edging and border structure which includes a plurality of blocks each having side walls, end walls and a bottom wall; and also includes a plurality of block anchor members each of which is securer attached to the bottom wall of a respective block with the block anchor members being adapted to penetrate a ground; and further includes a plurality of coupling members each being securely and removably fastened to two adjacently disposed blocks.

Still yet another object of the present invention is to provide a new landscape edging and border structure that saves the user substantial time in lining the landscape with decorative edging.

Even still another object of the present invention is to provide a new landscape edging and border structure that is easy and convenient to use and install upon the ground.

These together with other objects of the invention, along with the various features of novelty which characterize the invention, are pointed out with particularity in the claims annexed to and forming a part of this disclosure. For a better understanding of the invention, its operating advantages and the'specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a side elevational view of the present invention.

FIG. 5 is an end elevational view of one of the blocks with one of the coupling members fastened thereto of the present invention.

FIG. 6 is a top plan view of a second embodiment of the blocks of the present invention.

FIG. 7 is a top plan view of a second embodiment of the coupling member of the present invention.

DESCRIPTION OF THE PREFERRED EMBODIMENT

Figure 1:
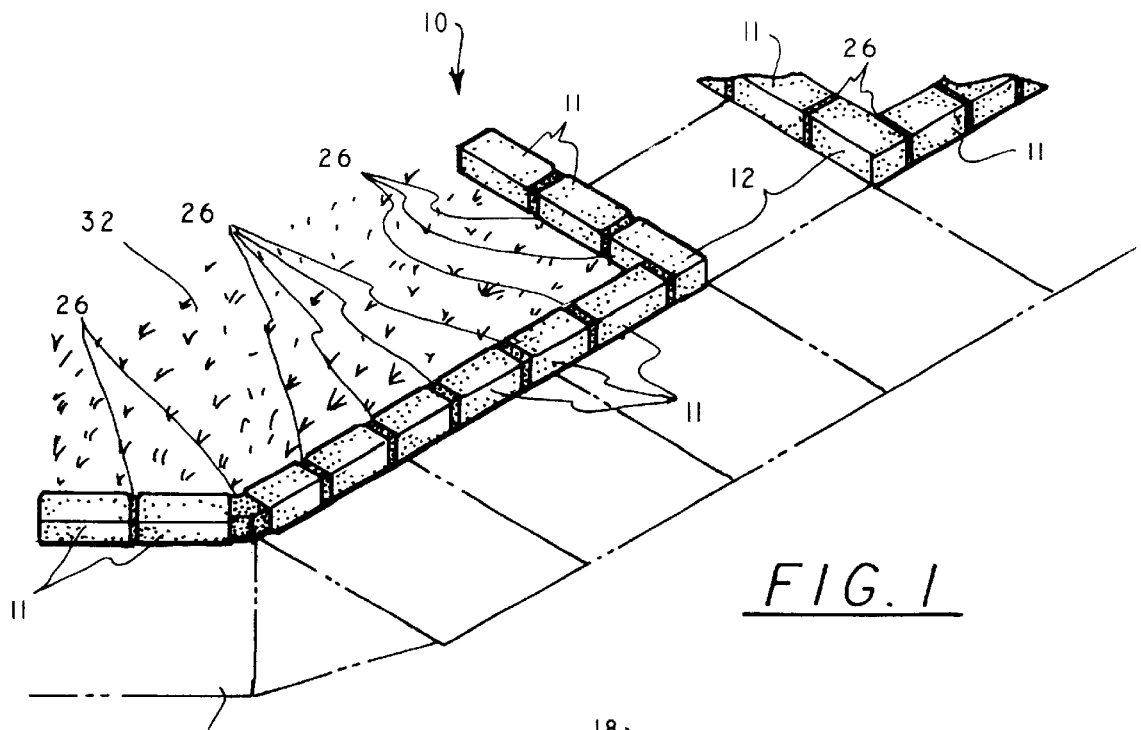
FIG. 1 is a perspective view of a new landscape edging and border structure according to the present invention and being shown in use.
Figure 2:
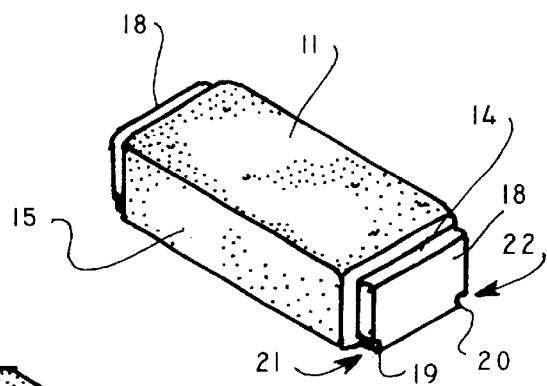
FIG. 2 is a perspective view of the one of the blocks of the present invention.
Figure 3:
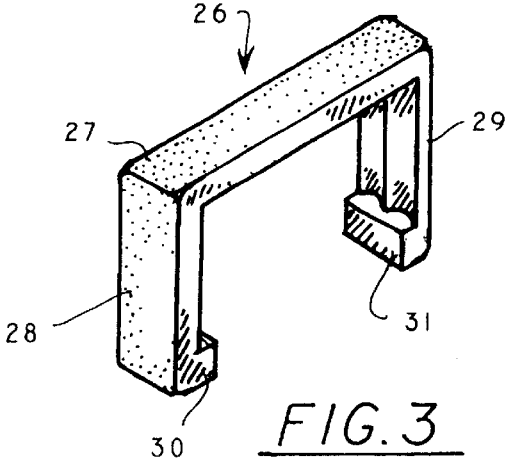
FIG. 3 is a perspective view of one of the coupling members of the present invention.

With reference now to the drawings, and in particular to FIGS. 1 through 7 thereof, a new landscape edging and border structure embodying the principles and concepts of the present invention and generally designated by the reference numeral 10 will be described.

As best illustrated in FIGS. 1 through 7, the landscape edging and border structure 10 generally comprises a plurality of blocks 11,12 each having side walls 15,16, end walls 13,14 and a bottom wall 17. Each of the blocks 11,2 includes boss members 18 integrally attached thereto and extending therefrom and being adapted to fastenably receive coupling members 26 thereabout. The blocks 11,12 include corner blocks 12 and in-line blocks 11 with each of the in-line blocks 11 having the boss members 18 integrally attached to and extending outwardly from the end walls 13,14 thereof, and with each of the corner blocks 12 having a first of the boss members 18 integrally attached to one of the end walls 13,14 thereof and having a second of the boss members 18 integrally attached to one of the side walls 15,16 near the other end wall 13,14 and being distally disposed relative to the first boss member 18. The in-line blocks 11 are disposed end-to-end with the boss members 18 being in contactable relationship. The second boss member 18 of a respective corner block 12 is in contactable relationship with one of the boss members 18 of an adjacent in-line block 11. Each of the boss members 18 is essentially a rectangular structure having bottom corners 19,20, and each of the boss members 18 also have perimeter slots 21,22 extending in the bottom corners 19,20 thereof with each of the boss members 18 being relatively smaller than the end walls 13,14 of the blocks 11,12. Each of the blocks 11,12 is approximately 10 inches long, 5 inches wide, and 5 inches high.

The landscape edging and border structure 10 also includes a plurality of block anchor members 23 each of which is securely and conventionally attached to the bottom wall 17 of a respective block 11,12 with the block anchor members 13 being adapted to penetrate a ground 32. Each of the block anchor members 23 includes a tapered shaft 24 having a first end integrally attached to a respective block 11,12 and also having an arrow tip-shaped second end 25 for easy penetration into the ground 32 and for securely anchoring the block 11,12 to the ground 32.

The landscape edging and border structure 10 further includes a plurality of the coupling members 26 each being securely and removably fastened to two adjacently disposed blocks 11,12. Each of the coupling members 26 includes an elongate main portion 27 having ends, and also includes extended end portions 28,29 integrally extending outwardly from the ends of the main portion 27, and further includes flange members 30,31 integrally attached near ends of the extended end portions 28,29 and being adapted to be received in the perimeter slots 21,22 in the boss members 18 for fastening adjacent blocks 11,12 together. The extended end portions 28,29 are disposed generally perpendicular to the main portion 27 and are spaced from and disposed parallel to each other with the flange members 30,31 being disposed between the extended end portions 28,29. Each of the coupling members 26 is adapted to fasten about two adjacently-disposed boss members 18 with the coupling members 26 being adapted to couple the blocks 11,12 in a straight line, at approximately 45 degrees to one another, and at 90 degrees to one another.

In use, the user secures the blocks 11,12 to the ground 32 by inserting the block anchor members 23 into the ground 32 with the in-line blocks 11 being arranged end-to-end and with some of the in-line. blocks 11 being disposed approximately 45 degrees relative to other in-line blocks 11. In addition, the corner blocks 12 are securely anchored upon the ground 32. The user then fastens the coupling members 26 about pair's of adjacently-disposed boss members 18 to securely fasten the blocks 11,12 together. The blocks 11,12 can be arranged along the borders of sidewalks 33, gardens, and driveways.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. Landscape edging and border structure comprising:
   a plurality of blocks each having side walls, end walls and a bottom wall, the end walls of each said block being closed, each said block having a boss member located at at least one of said end walls of the block;
   a plurality of block anchor members each of which is securely attached to said bottom wall of a respective said block, said block anchor members being adapted to penetrate a ground; and
   a plurality of coupling members each being securely and removably fastenable to two of said blocks having the boss members of said blocks being abutted against each other, a said coupling member removably engaging the abutting said boss members to hold the adjacently disposed blocks in an abutted condition
   wherein said blocks include corner blocks and in-line blocks;
   each of said in-line blocks has one of said boss members integrally attached to and extending outwardly from each of said end walls of said block, and each of said corner blocks has a first of said boss members integrally attached to one of said end walls of said block and has a second of said boss members integrally attached to one of said side walls near the other end wall and being distally disposed relative to said first boss member.

2. Landscape edging and border structure as described in claim 1, wherein each of boss members includes a ridge protruding from the boss member and extending substantially parallel to the side of aid block.

3. Landscape edging and border structure as described in claim 1, wherein positioning of the boss members of said in-line blocks in an abutted condition disposes said blocks in an end-to-end relationship.

4. Landscape edging and border structure as described in claim 1, wherein said second boss member of a respective said corner block is in contactable relationship with one of said boss members of an adjacent said in-line block.

5. Landscape edging and border structure as described in claim 1 wherein each of said boss members is essentially a rectangular structure having bottom corners.

6. Landscape edging and border structure as described in claim 5, wherein each of said boss members also have perimeter slots extending in said bottom corners thereof.

7. Landscape edging and border structure as described in claim 1, wherein each of said boss members is relatively smaller than said end walls of said blocks.

8. Landscape edging and border structure as described in claim 6, wherein each of said coupling members includes an elongate main portion having ends, and also includes extended end portions integrally extending outwardly from said ends of said main portion, and further includes flange members integrally attached near ends of said extended end portions, said flange members being insertable in said perimeter slots in said boss members for fastening adjacent said blocks together.

9. Landscape edging and border structure as described in claim 8, wherein said extended end portions are disposed generally perpendicular to said main portion and are spaced from and disposed parallel to each other.

10. Landscape edging and border structure as described in claim 8, wherein said flange members are disposed between said extended end portions.

11. Landscape edging and border structure as described in claim 1, wherein each of said coupling members is adapted to fasten about two adjacently-disposed said boss members, said coupling members being adapted to couple said blocks in a straight line, at approximately 45 degrees to one another, and at 90 degrees to one another.

12. Landscape edging and border structure as described in claim 1, wherein each of said block anchor members includes a tapered shaft having a first end integrally attached to a respective said block and also having an arrow tip-shaped second end for easy penetration into the ground and for securely anchoring said block to the ground.

13. Landscape edging and border structure comprising:
    a plurality of blocks each having side walls, end walls and a bottom wall, the end walls of each said block being closed, each said block having a boss member located at at least one of said end walls of the block, said blocks including corner blocks and in-line blocks, each of said in-line blocks having said boss members integrally attached to and extending outwardly from said end walls thereof, and each of said corner blocks having a first of said boss members integrally attached to one of said end walls thereof and it having a second of said boss members integrally attached to one of said side walls near the other said end wall and being distally disposed relative to said first boss member, said in-line blocks being disposed end-to-end with said boss members being in contactable relationship, said second boss member of a respective said corner block being in contactable relationship with one of said boss members of an adjacent said in-line block, each of said boss members being essentially a rectangular structure having bottom corners, each of said boss members also having perimeter slots extending in said bottom corners thereof, each of said boss members being relatively smaller than said end walls of said blocks, each of said blocks being approximately 10 inches long, 5 inches wide, and 5 inches high;
    a plurality of block anchor members each of which is securely attached to said bottom wall of a respective said block, said block anchor members being adapted to penetrate a ground, each of said block anchor members including a tapered shaft having a first end integrally attached to a respective said block and also having an arrow tip-shaped second end for easy penetration into the ground and for securely anchoring said block to the ground; and
    a plurality of coupling members each being securely and removably fastenable to two of said blocks having the boss members of said blocks being abutted against each other, a said coupling member removably engaging the abutting said boss members to hold the adjacently disposed blocks in an abutted condition, each of said coupling members including an elongate main portion having ends, said coupling members including extended end portions integrally extending outwardly from said ends of said main portion, and further including flange members integrally attached near ends of said extended end portions, said flange portions being receivable in said perimeter slots in said boss members for fastening adjacent said blocks together, said extended end portions being disposed generally perpendicular to said main portion and being spaced from and disposed parallel to each other, said flange members being disposed between said extended end portions, each of said coupling members being adapted to fasten about two adjacently-disposed said boss members, said coupling members being adapted to couple said blocks in a straight line, at approximately 45 degrees to one another, and at 90 degrees to one another.

* * * * *